United States Patent [19]
Seiz

[11] 3,814,034
[45] June 4, 1974

[54] LOAD SUPPORTS FOR STORAGE STRUCTURES

[76] Inventor: Edward A. Seiz, 136 E. Third St., Lansdale, Pa. 19446

[22] Filed: Oct. 27, 1972

[21] Appl. No.: 301,469

Related U.S. Application Data

[60] Division of Ser. No. 134,618, April 16, 1971, Pat. No. 3,720,268, which is a continuation-in-part of Ser. No. 15,998, March 3, 1970, Pat. No. 3,626,487, which is a continuation-in-part of Ser. No. 728,182, May 10, 1968, Pat. No. 3,545,626.

[52] U.S. Cl.................. 108/111, 211/148, 211/177, 248/250
[51] Int. Cl. ............................................. A47f 5/00
[58] Field of Search ............ 108/111; 211/148, 177, 211/176, 153; 248/250; 52/482, 483

[56] References Cited
UNITED STATES PATENTS

| | | | |
|---|---|---|---|
| 1,801,240 | 4/1931 | Schaffert.......................... | 52/482 X |
| 2,834,478 | 5/1958 | Macdonald..................... | 248/250 X |
| 3,018,862 | 1/1962 | Litteral.......................... | 211/148 X |
| 3,244,290 | 4/1966 | Kaufman............................ | 211/148 |
| 3,263,821 | 8/1966 | Klene................................ | 211/177 X |
| 3,265,456 | 8/1966 | Woolever......................... | 211/148 X |
| 3,285,428 | 11/1966 | Scheck............................... | 211/148 |
| 3,349,924 | 10/1967 | Maurer............................. | 211/177 |
| 3,463,325 | 8/1969 | Zagotta........................... | 211/177 X |
| 3,724,078 | 4/1973 | Carlin.............................. | 211/153 X |

*Primary Examiner*—Francis K. Zugel
*Attorney, Agent, or Firm*—Howson & Howson

[57] ABSTRACT

A storage structure having a pair of horizontally-disposed parallel load beams is provided with a series of load-carrying members which are fastened in spaced parallel relation to the beams. Each member has a pair of longitudinal flanges, and each beam has a series of upstruck ears located at spaced intervals along its length. The ears are deformed against and interlock with the flanges during assembly to secure the members against movement.

7 Claims, 6 Drawing Figures

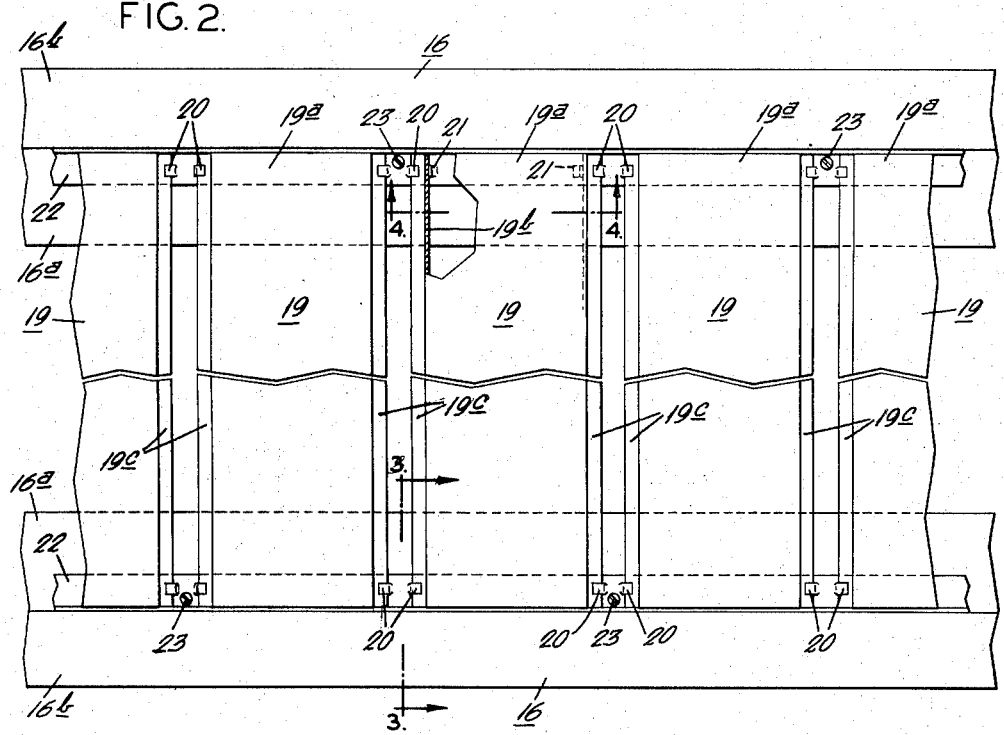
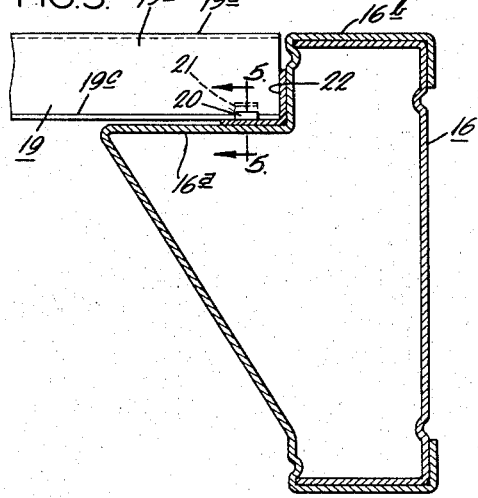
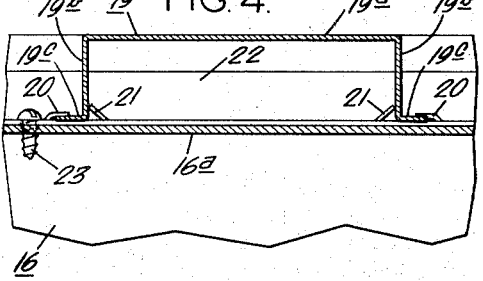
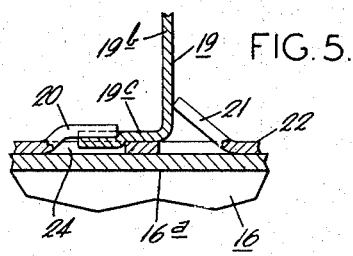
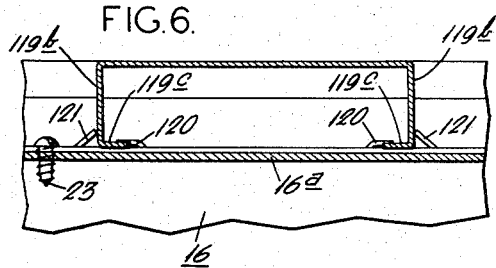

LOAD SUPPORTS FOR STORAGE STRUCTURES

The present application is a division of a co-pending application Ser. No. 134,618 filed Apr. 16, 1971 and entitled "Fire Resistant Storage Structure" now U.S. Pat. No. 3,720,268 which is a continuation-in-part of application Ser. No. 15,998 filed Mar. 3, 1970 and entitled "Fire And Vermin Storage Structure Having Fail-Safe Features" now U.S. Pat. No. 3,626,487 which was a continuation-in-part of application Ser. No. 728,182 filed May 10, 1968 and entitled "Storage Structure," now U.S. Pat. No. 3,545,626.

The present invention relates to storage structures, and more particularly, the present invention relates to load carrying members and means for mounting the same in storage structures.

Presently, many warehouses have sprinkler systems for dispersing water or fire-retardant chemicals in the vicinity of a fire when it occurs. In order for the sprinkler system to be most effective, however, it is desirable for the sprinkler heads to be located in close proximity to the fire so that the water or chemical can be sprayed directly thereon without interference by shelving which tends to deflect the flow of the fire-extinguishing fluid. With a view toward solving this problem, a storage structure has been provided which promotes the distribution of fire-extinguishing fluid.

In my earlier patent application Ser. No. 15,998, continuous shelving spans between horizontally-disposed load beams for supporting load materials. Because of the propensity for such shelving to interfere with the dispersion of fire-retardant substance, a shelving structure which permit the ready passage of the fire-retardant substance is highly desirable. Such shelving is particularly suited for use in storage structures in which combustible materials such as carpets and the like are stored.

A degree of permeability may be afforded shelving in a storage structure by locating load-planks at spaced intervals on the beams; however, unless the ends of the planks are securely fastened to the beams, they may become disoriented and may even disengage the beams when the load materials are being removed, since there is a tendency for the beams to bow outwardly when the materials are slid from the shelving. Accordingly, a storage structure possessing shelving which is permeable to fire-retarding fluids and which is capable of being installed in a minimum amount of time and without skilled labor is highly desirable.

In some storage structures, heavy load supporting members have been used to provide maximum resistance to deflection under load. To reduce the weight of the structure when unloaded and for shipping, load support members have been formed from sheet metal into various shapes such as box beams and the like. It is noted, however, that the cost to manufacture such beams has not been justified in relation to the weight reduction obtained and the negligible reduction in shipping volume.

With the foregoing in mind, it is a primary object of the present invention to provide a novel storage structure which promotes the distribution of a fire-extinguishing substance in the vicinity of the structure in response to a fire.

It is another object of the present invention to provide for storage structures improved shelving which is economical to install and which affords minimum interference with the dispersion of fire-retarding substances in the vicinity of the structure.

It is a further object of the present invention to provide an arrangement of load-carrying members which enables the use of relatively light gage metal in shapes which may be readily stacked for shipping and which when assembled according to the present invention, provide structural support comparable to heavy structural members.

As a still further object, the present invention provides an improved rack structure which is economical to assemble.

More specifically, the present invention provides shelving for storage structures. The shelving includes a series of support members spanning between the beams at spaced intervals. The support members have longitudinally extending flanges which are interlockingly engaged adjacent each end by means of downwardly forced ears struck upwardly from ledge means on the beam. Stake means is also struck from the ledge means and operated to temporarily locate the members during assembly onto the beams and to position the members during subsequent deformation of the ear means against the flanges to interlock the members and the beams.

These and other objects, features and advantages of the present invention should become apparent from the following description when taken in conjunction with the accompanying drawings in which:

FIG. 2 is an enlarged, fragmentary plan view illustrating a series of longitudinally-foreshortened support members fastened at their ends to the beams;

Figure 1:
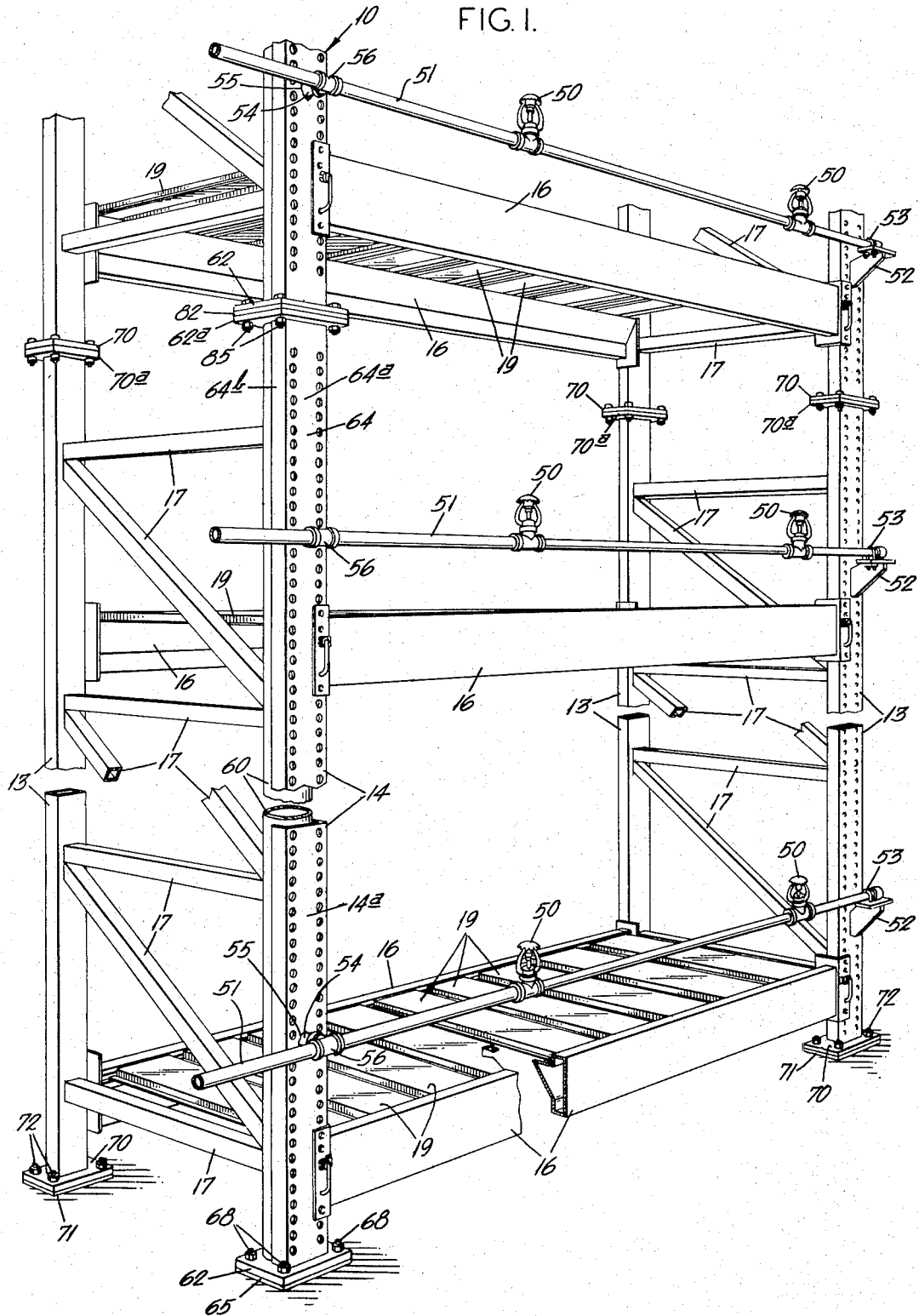
FIG. 1 is a perspective view, with portions broken away, of the back of a storage structure embodying the present invention, the structure having one wet and three dry uprights, beams, and support members providing shelving, with adjacent uprights being interconnected by bracing to form end frames.

FIGS. 3 and 4 are enlarged sectional views taken along lines 3—3 and 4—4, respectively, of FIG. 2;

FIG. 5 is an enlarged sectional view taken along line 5—5 of FIG. 3 to illustrate ear means by which the support members are fastened to the beams;

FIG. 6 is a fragmentary sectional view similar to FIG. 4 of a modified embodiment of the present invention.

Referring now to the drawings, there is illustrated in FIG. 1 the rear of a storage structure or rack 10 embodying the present invention. In the present instance, the structure comprises three dry uprights 13, one wet upright 14, and beams 16,16 which extend horizontally between the uprights. The uprights at each end of the structure are connected together in spaced relation by means of bracing 17 extending both horizontally and diagonally between adjacent uprights to thereby provide a free-standing structure. In the illustrated embodiment, shelving in the form of a series of support members 19,19 spans across the beams 16 for supporting load materials, for example, rolls of carpeting (not shown).

In accordance with the present invention, the support members 19,19 are securely fastened in spaced parallel relation to one another and to the beams by means of a connection which enables economies to be effected in the assembly of the structure. To this end, each support member 19 has longitudinally extending flange means 19c,18c and the members are secured to the beams by means of upstruck ears 20,20 which are displaced downwardly during assembly to interlockingly engage the flange means 19c,19c and thereby to prevent outward bowing of the beams and possible disarray on or disengagement of the members from the beams. In the embodiment illustrated in FIGS. 2–5, each support member 19 is of one-piece, angulated or rolled-channel construction, having an inverted U-shaped transverse cross-section (FIG. 4) with an upwardly-facing load-engaging surface 19a and a pair of longitudinally extending upright web portions 19b,19b which terminate in the flanges 19c,19c. In the illustrated embodiments, the flanges 19c,19c are disposed in a plane parallel to the load-surface 19a and are turned at a right angle with respect too the upright web portions 19b,19b. In the embodiment of FIG. 4, the flanges 19c,19c are turned outwardly from the webs 19b,19b and the ears 20,20 engage the flanges 19c,19c outboard of the webs 19b,19b; however in the embodiment of FIG. 6, flanges 119c, 119c are turned inwardly toward one another and the ears 120,120 engage the flanges 119c,119c inboard of the webs 119b,119b.

For the purpose of locating the members 19,19 relative to the beams 16,16 before the ears 20,20 are interlocked with the flanges 19c,19c, stake means is provided on the beams. As may be seen in FIG. 4 and 6, the stake means include a pair of upstruck stakes or stops 21,21 which engage the upright webs 19b,19b on the sides thereof opposite the flanges 19c,19c. In addition to locating the members during assembly, the stops 21,21 prevent displacement of the webs 19b,19b away from the ears 20,20 when the ears are forced downwardly into engagement with the flanges. In the embodiment illustrated in FIG. 6, stops 121,121 are also provided for the same purpose.

In the present invention, ledge means on the beams underlies and supports the ends of the support members 19,19 and the ears 20,20 and props 21,21 are struck upwardly from the ledge means. As seen in FIG. 3, the ledge means includes an angle member 22 extending along substantially the length of the beam 16 and secured thereto at spaced intervals by threaded fasteners 23,23. In both embodiments of the present invention, the ears are connected to the ledge means a spaced distance from the upright web portions and extend laterally or transversely to the support member. In the present instance, each beam has a downwardly-offset portion 16a which underlies the angle member 22, and which is located with respect to the upper edge 16b of the beam 16 so as to dispose the load-engaging surface 19a at each support member 19 substantially coplanar with the top edge 16b of the beam 16. Thus, a substantially planar shelf-surface is provided in the structure 10.

Preferably, both the angle member 22 and the support members 19,19 are of steel; however, it is desirable for the material of the angle member 22 to be harder relative to the support member so as to sever at least a portion of the outer margin of the flange 19c and to displace the severed portion into the recess 24 formed when the ear 20 is struck from the angle member 22. Thus, the ear 20 resists in horizontal shear forces tending to bow the beam 16 and to disengage the support members 19,19 therefrom.

In assembling the shelving, after erection of the structure 10 as described in my aforementioned patent applications, the support members are arranged on the angle members 22 with the stakes or stops 21,21 engaging the web portions thereof, and the ears 20,20 are struck downwardly, for example, by means of a punch and hammer to effect a secure interconnection. The angle members 22,22 are then fastened to the beams 16,16 by the threaded fasteners 23,23.

An important advantage is realized when the support members are secured in this manner. By virtue of this connection, the flanges 19c,19c, and hence the upright web portions 19b,19b, are constrained against outward displacement when the support member is loaded, and thus there is provided at the ends of the support members a box-like structure which functions to increase the flexural resistance of the support member. Hence, a strong but lightweight support structure is provided, resulting in the economies noted heretofore.

Although the stakes 21,21 and the ears 20,20 are struck from a separate angle element 22, it may be desirable in certain instances to strike them from the beam 16. For instance, the stakes and ears could be struck from the downwardly-offset portion 16a of the beam. In the present instance, however, separate angle members are employed to facilitate assembly and to permit the use of standard beams which are normally installed in structures of the type described herein and in my aforementioned patent applications.

In view of the foregoing, it should be apparent that novel shelving has now been provided for a storage structure. The improved shelving is securely fastened to the beams in the structure by means of a unique connection which maintains the shelving in proper array on the beams and which is readily effected without the need for highly skilled workmen.

While a preferred embodiment of the present invention has been described in detail, various modifications, alterations and changes may be made without departing from the spirit and scope of the present invention as defined in the appended claims.

I claim:

1. In a storage structure comprising spaced uprights, at least a pair of horizontally-spaced beams extending between said uprights, and at least one load carrying support member spanning between said beams, the improvement comprising at least one flange on each end of said support member, means providing a ledge on each beam underlying said end of said support member and engaging the underside of said flange to support the member, an ear struck upwardly from said ledge and forming a recess in said ledge, a portion of said flange being severed and offset downwardly into said recess with said ear engaging the upperside of said flange to maintain said severed portion in said recess for preventing horizontal and vertical disengagement of said flange from said ledge.

2. Apparatus according to claim 1 wherein said ledge means is hard relative to said flange, so that said ear is capable of cleanly severing said flange when forced downwardly against the upper side of said flange.

3. Apparatus according to claim 2 including an L-shaped element extending along substantially the length of each beam and providing said ledge means, and including means to fasten said element to each beam.

4. Apparatus according to claim 1 wherein said support member comprises an integral member having a load engaging surface and an upright web portion depending from said surface and terminating in said flange means and disposed at an angle with respect thereto, and said ledge means includes means providing integral stops associated with said ear means and spaced therefrom to engage said upright web portion on the side thereof opposite said flange means for locating said members relative to said ledge means and providing a firm interlock therebetween.

5. Apparatus according to claim 4 wherein said support member includes a pair of upright web portions and a pair of said flanges turned inwardly toward one another with said stop means being located outboard of the web portions of said members.

6. Apparatus according to claim 4 wherein said flange means includes a pair of flanges coextensive in length with said upright web portion and turned outwardly away from one another with said stop means being located inboard of the web portions of said members.

7. Apparatus according to claim 4 wherein said support member has a U-shaped transverse cross-section with a pair of upright web portions and said ear means extends transversely to said support member and is connected to said ledge means at a location spaced from said upright web portions so that said ear and stop means cooperate to prevent transverse displacement of the web portion and flange means when the members are loaded.

* * * * *